United States Patent
Wegener et al.

(10) Patent No.: US 9,650,289 B2
(45) Date of Patent: May 16, 2017

(54) ARSENIC AND ANTIMONY FREE, TITANIUM OXIDE CONTAINING BOROSILICATE GLASS AND METHODS FOR THE PRODUCTION THEREOF

(75) Inventors: Holger Wegener, Alfeld (DE); Rainer Schwertfeger, Eschershausen (DE); Lenka Grygarova, Goslar (DE); Reinhard Kassner, Delligsen (DE)

(73) Assignee: SCHOTT AG, Mainz (DE)

( * ) Notice: Subject to any disclaimer, the term of this patent is extended or adjusted under 35 U.S.C. 154(b) by 351 days.

(21) Appl. No.: 13/572,870

(22) Filed: Aug. 13, 2012

(65) Prior Publication Data

US 2013/0207058 A1 Aug. 15, 2013

(30) Foreign Application Priority Data

Aug. 12, 2011 (DE) .................. 10 2011 052 622

(51) Int. Cl.

| | |
|---|---|
| *C03C 3/093* | (2006.01) |
| *C03C 4/10* | (2006.01) |
| *C03C 4/08* | (2006.01) |
| *C03C 3/11* | (2006.01) |
| *F21V 9/04* | (2006.01) |
| *F21V 9/06* | (2006.01) |
| *G02B 5/22* | (2006.01) |
| *G02B 5/26* | (2006.01) |

(52) U.S. Cl.
CPC ............... *C03C 4/10* (2013.01); *C03C 3/093* (2013.01); *C03C 3/11* (2013.01); *C03C 4/085* (2013.01)

(58) Field of Classification Search
USPC .................. 65/66, 90, 99.2; 252/588; 501/67
See application file for complete search history.

(56) References Cited

U.S. PATENT DOCUMENTS

| | | | |
|---|---|---|---|
| 1,995,952 A | | 3/1935 | Taylor |
| 4,562,161 A | * | 12/1985 | Mennemann ........... C03C 3/091 |
| | | | 501/58 |
| 6,013,977 A | * | 1/2000 | Sasaki et al. ................. 313/417 |
| 6,255,238 B1 | * | 7/2001 | Brocheton ..................... 501/56 |
| 7,867,934 B2 | | 1/2011 | Nagaoka |
| 2004/0176237 A1 | * | 9/2004 | Ott .......................... C03C 3/091 |
| | | | 501/66 |

FOREIGN PATENT DOCUMENTS

| | | |
|---|---|---|
| DE | 102009029086 A1 | 3/2011 |
| DE | 102011052622 | 10/2012 |
| JP | 2007-010596 | 1/2007 |
| JP | 2006-206337 | 8/2012 |
| WO | 0149620 A2 | 7/2001 |

\* cited by examiner

*Primary Examiner* — Bijan Ahvazi
(74) *Attorney, Agent, or Firm* — Ohlandt, Greeley, Ruggiero & Perle, L.L.P.

(57) ABSTRACT

Titanium oxide containing borosilicate glasses, which have been produced without the use of arsenic and antimony compounds, are provided. An environmentally friendly refining method for providing titanium oxide containing borosilicate glass is also provided. The method includes using oxygen containing selenium compounds as refining agents to provide glasses with good transmittance values in the infrared range and show no disturbing discolorations. The glasses of the present disclosure are particularly suitable for the production of IR light conductors, cover glasses for photo sensors, and UV filters.

14 Claims, 1 Drawing Sheet

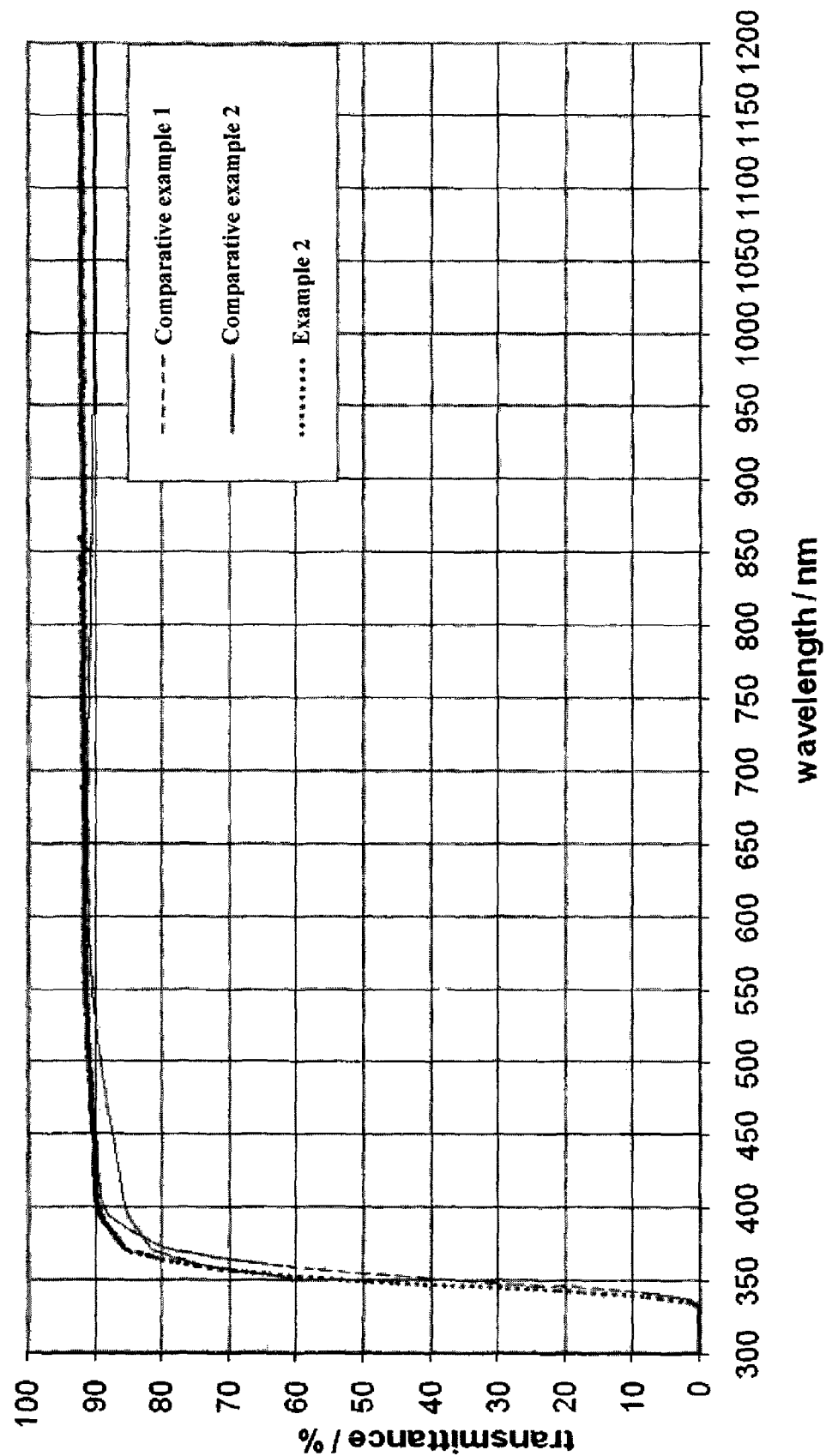

ARSENIC AND ANTIMONY FREE, TITANIUM OXIDE CONTAINING BOROSILICATE GLASS AND METHODS FOR THE PRODUCTION THEREOF

CROSS REFERENCE TO RELATED APPLICATIONS

This application claims benefit under 35 U.S.C. §119(a) of German Patent Application No. 10 2011 052 622.6, filed Aug. 12, 2011, the entire contents of which are incorporated herein by reference.

BACKGROUND OF THE INVENTION

1. Field of the Invention

The present disclosure relates to titanium oxide containing borosilicate glasses, wherein during the production thereof no arsenic and antimony compounds have been used as refining agents. Furthermore, the present disclosure comprises an environmentally friendly refining method for borosilicate glasses based on the use of oxygen containing selenium compounds as refining agents.

The glasses of the present disclosure are free of disturbing shades of yellow or brown, which often occur with the production of titanium oxide containing glass compositions, when no arsenic and antimony compounds are used as refining agents.

The glasses according to the present disclosure are particularly suitable as raw material for the production of infrared (IR) light conductors, cover glasses for photo sensors, ultraviolet (UV) filter glasses or the like.

2. Description of the Related Art

Glass compositions having a content of iron oxide of 50 to 200 parts per million (ppm) as often occurs in the case of $TiO_2$ containing borosilicate glasses are prone to discoloration during the melting process. The contents of iron oxide are common and are caused by impurities of the main components of the glass with this substance. The discoloration is due to the formation of iron(II) titanate, thus $FeTiO_3$ or ilmenite, which is—formally speaking—a mixed compound of titanium dioxide $TiO_2$ and iron(II) oxide, FeO. For the formation of ilmenite it is necessary that the iron which is present in the glass melt is present in its divalent oxidation state. On the other hand, the formation of ite is inhibited, when large portions of the iron are present in the oxidation state +III, as in the case of $Fe_2O_3$.

This can be achieved with the addition of oxidizing substances to the glass melt which cause successive release of elementary oxygen or other oxidizing gases in the glass melt and thus provide a more or less constant concentration of the oxidizing gas in the glass melt. The constant level of the oxidizing gases in turn results in that the metals which are present in the glass melt, also including iron, remain in their higher oxidation states or after all are converted into them during the melting and refining process. In oxidized form these compounds normally only cause mild to no discoloration of the glass. Also during and after solidification such oxidized compounds are not reduced.

For achieving a permanently high level of $O_2$ in the glass melt, in practice preferably a mixture of arsenic and antimony oxides or different oxides of arsenic or antimony separately from each other are used.

Such mixtures gradually release oxygen gas, wherein antimony oxide has a high peak of $O_2$ release at about 1150 degrees Celsius (° C.), whereas the peak of $O_2$ release of arsenic oxide reaches temperatures of up to 1250° C. or higher. Thus, these oxides work at temperatures which allow their use as refining agents in a lot of glass melts.

A great disadvantage of these refining systems of arsenic and antimony oxides is the high toxicity and environmental harmfulness of the arsenic and antimony compounds, for which reason their use is already limited today by legal restrictions which in future may become more strict. Therefore, in glass industry there is a demand for suitable substitutes of these effective refining agents.

An option which is often chosen is the use of sulfates, tin oxide, halides or a combination of these substances. But these substances normally result in a much lower oxidation effect in the glass melts during the refining process which in turn leads to brown coloration of the glasses by the formation of ilmenite.

At higher process temperatures halides are highly volatile compounds which in turn results in quick depletion of the glass melts from these compounds. This in turn makes it necessary to overdose the halide refining agents. This overdose in turn results in higher emissions of hydrohalogen acids. On the one hand, this is not desirable in view of environmental compatibility of the process. On the other hand, the increased release of acids results in accelerated wear of the production facilities and thus increases the process costs in the long term.

Also nitrates, such as for example potassium nitrate, which are optionally used as substitutes of refining agents, have the tendency of releasing the oxidizing gases generated during the decomposition, especially the oxygen, too early, i.e. at temperatures which are too low into the glass melt. For this reason, they are also poorly suitable for use in a refining process at temperatures of above 1000° C. Preferably, nitrates are used in combination with arsenic(III) oxide or antimony(III) oxide which are thereby converted in the glass melt into As(V) oxide or antimony(V) oxide. As such they release oxygen during the refining process.

A further conceivable possibility for generating an oxidizing milieu in the glass melt is the direct bubbling of oxygen into the melt aggregates. However, such a method is only suitable for such processes in which large process receptacles are used. But with such methods finely divided oxygen in the glass melt cannot be achieved with the technical possibilities available till today in contrast to the use of refining agents.

SUMMARY OF THE INVENTION

Therefore, it is the object of the present disclosure to provide titanium oxide containing borosilicate glasses without any disturbing discolorations, even though no arsenic or antimony compounds are used in the refining process of the glasses. Furthermore, the respective glasses should also have transmittance values in the IR range which are common for glasses for which arsenic and antimony compounds are used as refining agents.

The object is solved by an arsenic- and antimony-free borosilicate glass, comprising the following oxides, in percent (%) by weight, based on the total amount of glass:

| | |
|---|---|
| $SiO_2$ | 30 to 85 |
| $B_2O_3$ | 3 to 20 |
| $Al_2O_3$ | 0 to 15 |
| $Na_2O$ | 3 to 15 |
| $K_2O$ | 3 to 15 |
| ZnO | 0 to 12 |

| | |
|---|---|
| TiO$_2$ | 0.5 to 10 |
| CaO | 0 to 0.1 | as well as at least one oxygen containing selenium compound in amounts of 0.001% by weight to 0.1% by weight, based on the total amount of glass.

The matrix of the glass comprises SiO$_2$ in a proportion of at least 30% by weight, preferably at least 35% by weight and particularly preferably at least 40% by weight, based on the total amount of glass. SiO$_2$ is an important network former in the glass matrix which influences the glass properties. In particular, SiO$_2$ is especially important for the chemical resistance of the glass. The content of SiO$_2$ in the glass is at most 85% by weight, preferably at most 75% by weight and particularly preferably at most 70% by weight, based on the total amount of glass. Contents of SiO$_2$ which are too high may result in a too strong increase of the softening point of the glass.

Besides SiO$_2$ the glass according to the present disclosure also comprises at least one second network former. The glass contains B$_2$O$_3$ as an additional network former which is contained in a proportion of at least 3% by weight, preferably at least 4% by weight and particularly preferably at least 5% by weight, based on the total amount of glass. Through its network forming properties B$_2$O$_3$ essentially supports the stability of the glass. In the case of contents of B$_2$O$_3$ which are too low the required stability in the borosilicate glass system cannot be guaranteed. Nevertheless, the content of B$_2$O$_3$ in the glass is at most 20% by weight, preferably at most 17% by weight and particularly preferably at most 15% by weight, based on the total amount of glass. In the case of contents of B$_2$O$_3$ in the glass which are too high the viscosity may be reduced strongly so that a reduction of the crystallization stability has to be accepted.

According to the present disclosure it is preferred that the glass comprises aluminium oxide. The addition of aluminium oxide serves to improve glass forming and generally supports the improvement of chemical resistance. The proportion of aluminium oxide in the glass according to the present disclosure is at most 15% by weight, preferably at most 12% by weight and particularly preferably at most 10% by weight, based on the total amount of glass. However, contents of aluminium oxide which are too high result in an increased tendency to crystallization. Preferably, the amount of aluminium oxide in the glass is at least 0.1% by weight, further preferably at least 0.5% by weight and most preferably at least 0.75% by weight, based on the total amount of glass. Particularly preferably, the amount of aluminium oxide in the glass is 1.0% by weight, 3% by weight, 5% by weight or 10% by weight.

The glass comprises alkali metal oxides in a proportion of at least 6% by weight, preferably at least 9% by weight and particularly preferably at least 12% by weight, based on the total amount of glass. As alkali metal oxides at least Na$_2$O and K$_2$O are contained in the glass according to the present disclosure.

Alkali metal oxides improve the meltability of the glass and thus allow an economic production. During the production of the glass they serve as fluxing agents. The sum of the alkali metal oxides in the glass should not exceed the value of 30% by weight, preferably 26% by weight and particularly preferably 24% by weight. In the case of contents of alkali metal oxides which are too high the weathering resistance of the glass may be compromised and thus the range of applications thereof may strongly be limited.

The proportions of Na$_2$O and K$_2$O in the glass are at least 3% by weight each, preferably at least 4% by weight each, based on the total amount of glass. However, the proportions of Na$_2$O and K$_2$O in the glass are at most 15% by weight each, preferably at most 12% by weight each, based on the total amount of glass.

The glass compositions of the present disclosure comprise titanium dioxide. This substance is added to the glasses for improving their optical properties. In particular, with the help of additions of titanium dioxide the refractive index of the glasses can be adjusted in a targeted manner. So the refractive index increases with an increasing content of TiO$_2$ of the glass. The content of TiO$_2$ in the glass is at least 0.5% by weight, preferably at least 1% by weight and particularly preferably at least 1.5% by weight, based on the total amount of glass. The proportion of TiO$_2$ in the glass is at most 10% by weight, preferably at most 8% by weight and particularly preferably at most 6% by weight, based on the total amount of glass. Contents of TiO$_2$ which are too high may result in undesirable crystallization of the glass. The addition of titanium oxide is connected with a further advantage: by this measure the UV edge of the transmittance spectrum of the glass is shifted to higher wave lengths, wherein this shift is higher, when more titanium oxide is added.

In this way the glasses prepared according to the present disclosure can be used for a broad range of possible applications, such as for example as UV filters or the like. Therefore, the glasses according to the present disclosure are also suitable as UV filters. A comparable effect may be achieved for glasses without the addition of titanium oxide only by the application of an additional layer onto the glass, which may however reduce the transmittance.

As an additional fluxing agent as well as for adjusting the melting point in a targeted manner the glass compositions of the present disclosure may also comprise zinc oxide ZnO. By the addition of the network modifier ZnO the melting point of the glass may be reduced. The content of ZnO in the glass is at most 12% by weight, preferably at most 10% by weight and particularly preferably at most 8% by weight, based on the total amount of glass. Contents of ZnO which are too high may result in a too strong reduction of the melting point of the glasses according to the present disclosure.

The glass compositions of the present disclosure comprise low amounts of at least one oxygen containing selenium compound. Selenium compounds are added to the glasses according to the present disclosure during the production of the glass to increase the valence of iron during the melting process. The proportion of oxygen containing selenium compounds is at least 10 ppm (m/m), preferably at least 50 ppm (m/m) and particularly preferably at least 100 ppm (m/m), based on the total amount of glass. The total proportion of the oxygen containing selenium compound in the glass is at most 0.1% by weight, preferably at most 0.05% by weight and particularly preferably at most 0.01% by weight, based on the total amount of glass. Oxygen containing selenium compounds in proportions which are too high may result in coloration of the glasses, wherein pink coloration may be caused.

Preferably, the oxygen containing selenium compound is selected from salts of selenious acid (selenites), salts of selenic acid (selenates) and/or their hydrates, selenium dioxide (SeO$_2$), selenium trioxide (SeO$_3$) and mixtures thereof. A preferable salt of selenious acid (selenites) is sodium selenite (Na$_2$SeO$_3$). Sodium selenate decahydrate Na$_2$SeO$_4$.

$10H_2O$ is regarded as a preferred salt of selenic acid (selenates) and/or their hydrates. Especially preferably, the oxygen containing selenium compound is selected from selenium dioxide ($SeO_2$), sodium selenite ($Na_2SeO_3$) and mixtures thereof.

Particularly preferably, the oxygen containing compound is $SeO_2$. Particularly preferably, the glass comprises 0.001% by weight to 0.1% by weight of $SeO_2$, based on the total amount of glass.

In a preferred embodiment of the disclosure the glasses according to the present disclosure solely consist of the oxides of silicon, boron, aluminium, the alkali metals sodium and potassium, titanium, zinc and the at least one oxygen containing selenium compound, preferably $SeO_2$, i.e. the glass compositions consist of at least 90% by weight, further preferably of at least 95% by weight and particularly preferably of at least 98% by weight of the mentioned components. According to further preferable embodiments the glass is free of other components, which means that they are not mixed into the starting mixture. Impurities may be present in the glass.

In a further preferable embodiment of the disclosure the glass compositions according to the present disclosure contain besides the above mentioned oxides also small amounts of sulfate. In this case the content of sulfate in the glass is preferably at least 150 ppm (m/m), further preferably at least 250 ppm (m/m) and particularly preferably at least 350 ppm (m/m).

However, in particularly preferred embodiments of the disclosure the content of sulfate is not higher than 450 ppm (m/m), preferably not higher than 350 ppm (m/m) and particularly preferably not higher than 250 ppm (m/m), based on the total amount of glass.

Sulfate has been added to the glass compositions of the present disclosure during the production process for achieving a refining effect in the glass with it.

Other glasses according to the present disclosure may also contain further additives besides the above mentioned components. These further additives may for example be admixtures of further alkali or alkaline earth metal compounds (e.g. $Li_2O$, MgO, CaO) which have been added to the glass to manipulate the flowing and melting properties or the chemical resistance of the glass.

The disclosure also comprises glasses having the described composition which have been provided with additives to manipulate the optical properties, e.g. the refractive index, of the glasses. Preferably, such an additive is barium oxide (BaO). In such embodiments BaO is contained in a proportion of at least 0.001% by weight, based on the total amount of glass. With the addition of BaO the refractive index of the glass can be strongly increased.

Further additives which however can hardly be avoided and are undesirably present in the different embodiments of the glasses according to the present disclosure may be for example oxides of d group metals, such as iron oxides (FeO, $Fe_2O_3$, $Fe_3O_4$) or sulfur compounds (sulfides and sulfates). Iron oxides are common impurities of the main components of the glass, in particular impurities of the sand.

However, the glass compositions according to the present disclosure are free of compounds of arsenic and antimony. The fact that these compounds are not present means that no compounds of arsenic or antimony, in particular no oxides of arsenic and antimony are added to the glasses. Thus, the glasses according to the present disclosure comprise less than 10 ppm (m/m), preferably less than 5 ppm (m/m) and particularly preferably less than 1 ppm (m/m) of oxides of antimony, based on the total amount of glass. The proportion of arsenic oxide in the glass compositions according to the present disclosure is in the range of <3 ppm (m/m), preferably <2.5 ppm (m/m), based on the total amount of glass.

In preferable embodiments of the disclosure the glasses according to the present disclosure may be produced with the help of conventional methods for producing glass. Preferably, the method is selected from the down draw method, the overflow fusion method and the float method. However, also other production methods may be possible, such as for example methods which are commonly used for the production of glass tubes or glass containers.

The production of the glasses according to the present disclosure preferably comprises the following steps: mixing of starting components which are the normal raw materials of glass production, such as for example carbonates, sulfates, nitrates, hydroxides or oxides; heating the mixture to a temperature of at least 1350° C. to at most 1550° C., whereby a homogenous melt is formed; cooling the melt to the shaping temperature and during or after that optionally shaping the glass.

An embodiment of the disclosure is characterized in that said shaping is conducted in a stress-free manner by applying the melt onto a float bath.

A further embodiment of the disclosure uses the down draw method for shaping the glass.

According to an embodiment of the disclosure the refining process is conducted in a refining container which is especially intended for that or in an area of the glass production plant which is physically separated, preferably in a refining channel.

In an alternative embodiment of the disclosure no such additional refining receptacles (refining container or refining channel being physically separated) are used. In this case the refining process is conducted in a parallel manner to other process steps of the glass production, preferably in a parallel manner to the melt or the homogenization.

According to the present disclosure the refining agents comprise at least one selenium compound, preferably at least one oxygen containing selenium compound. In one embodiment of the disclosure the selenium compound is the sole refining agent. In this case the refining agent solely consists of the selenium compound. But also additional refining agents being different from selenium compounds may be used besides the selenium compound. Preferably, the additional refining agents are sulfates, preferably selected from alkali sulfates, alkaline earth sulfates and mixtures thereof. Particularly preferably, the sulfate is selected from $Na_2SO_4$, $CaSO_4$ and mixtures thereof.

Preferably, the selenium compound is selected from salts of selenious acid (selenites), salts of selenic acid (selenates) and/or their hydrates, selenium dioxide ($SeO_2$), selenium trioxide ($SeO_3$) and mixtures thereof. A preferred salt of selenious acid (selenites) is sodium selenite ($Na_2SeO_3$). As a preferred salt of selenic acid (selenates) and/or their hydrates sodium selenate decahydrate $Na_2SeO_4.10H_2O$ has to be mentioned. Especially preferably, the selenium compound is selected from selenium dioxide ($SeO_2$), sodium selenite ($Na_2SeO_3$) and mixtures thereof. Particularly preferably, the selenium compound is sodium selenite ($Na_2SeO_3$).

Surprisingly it was found that selenium has a special position under the multivalent elements with respect to the oxidation effect of its compounds in glass melts, like arsenic and antimony, but without having the disadvantages of the latter two (e.g. their tendency to emit highly toxic gases). Thus, in an advantageous manner selenium is different from other metals or semimetals, which compounds are normally used as substitutes of refining agents for the toxic compounds of arsenic and antimony but which do not show a behavior in analogy to selenium. This group of elements comprises for example tin, cerium or bismuth. It was shown that the compounds of these elements, in particular their oxides, do not result in the intended aim of the present disclosure, although the oxidation numbers of the elements in the higher oxides as well as the redox potentials of the elements and the decomposition temperatures of the compounds suggest that. Without being bound by any theory the inventors assume according to their experience and empiric knowledge till today that the reason for the special effect of the selenium compounds is the tendency of these compounds to release oxygen exactly in the temperature range in which the formation of ilmenite normally occurs. In this way, the addition of said selenium compounds can prevent the formation of ilmenite and the discoloration of the glasses which is connected therewith in a particularly effective manner.

A preferred embodiment comprises the use of tetravalent oxygen containing selenium compounds as sole refining agents.

Further embodiments of the disclosure are based on the use of a mixture of tetravalent and hexavalent oxygen containing selenium compounds. Optionally, at least one further refining agent being no selenium compound may be added.

In a preferable embodiment of the disclosure only one salt of selenious acid is used as the sole selenium compound in combination with at least one further refining agent being no selenium compound.

In a particularly preferable embodiment this salt of selenious acid is sodium selenite ($Na_2SeO_3$).

In a further preferable embodiment hexavalent oxygen containing selenium compounds are used as sole refining agents.

In a particularly preferable embodiment for the refining process of the glasses according to the present disclosure a salt of selenic acid or one or more hydrates of a salt of selenic acid are used as the sole selenium compound in combination with at least one further refining agent being no selenium compound.

In a further particularly preferable embodiment of the disclosure the salt of the selenic acid is sodium selenate $Na_2SeO_4$ and/or its hydrates.

In an alternative to the salts of selenious acid and selenic acid also anhydrides of both oxygen containing acids of selenium can be used: selenium dioxide ($SeO_2$) and selenium trioxide ($SeO_3$).

In preferable embodiments of the present disclosure instead of the salt of selenious acid or instead of the salt of selenic acid the respective anhydride is used as a refining agent.

In further preferable embodiments as refining agents the salts of selenious acid or selenic acid are used in combination with the anhydrides of both acids.

In preferable embodiments of the disclosure a sulfate is used as an additional refining agent besides the selenium compounds. Here, in particularly preferable embodiments of the disclosure alkali metal sulfates are used. In alternative embodiments alkaline earth metal sulfates are used as additional refining agents. But the sulfate may also comprise a mixture of alkali sulfates and alkaline earth sulfates.

In a special embodiment of the disclosure $Na_2SO_4$ is used as an additional refining agent. In a further embodiment $CaSO_4$ is used as an additional refining agent.

The present disclosure completely the targeted addition of arsenic or antimony compounds to the glasses is omitted.

The oxidation effect of the refining agents depends on their tendency to release gaseous, reactive oxygen into the glass melt. This preferably occurs with the partial or complete decomposition of the refining agent. With respect to the extent of its progress as well as with respect to its rate this process strongly depends on the temperature.

When the temperature of the glass melt in which the refining agent is present during the refining process is too low, then the decomposition of the refining agent is not sufficient or only very slow. Under these conditions the concentration of free oxygen in the glass melt cannot reach the level which is required, on the one hand, for achieving the desired refining effect and, on the other hand, for guaranteeing the oxidation of the $Fe^{2+}$ ions to $Fe^{3+}$ ions. Then too much iron ions remain in their low oxidation state and formation of ilmenite inclusions in the glass occurs, which lead to undesirable discoloration of the glass.

However, when the temperature of the glass melt during the refining process is too high, then the release of gaseous oxygen from the decomposing refining agent occurs with a rate which is also too high. The outcome thereof may be different. On the one hand, this may result in that the refining agent releases the oxygen already at a time at which the main part of the decomposition gases of the raw materials of the glass (e.g., $CO_2$, $SO_2$, $SO_3$) is not yet escaped from the melt. Then the refining agent cannot show its intended effect which is the entrainment of the last residual enclosed gases from the glass melt through the release of gaseous oxygen.

A further disadvantage of the fast decomposition of the refining agent is the fact that with this the adjustment of a relatively constant level of free reactive oxygen in the glass melt is hardly possible. However, such a level is required for avoiding the reduction of the $Fe^{3+}$ ions to $Fe^{2+}$ ions and keeping the concentration of $Fe^{2+}$ in the glasses at a level which is as low as possible.

The temperature of the glass melt should not be lower than at least 1300° C., preferably at least 1330° C. and particularly preferably at least 1360° C. In the case of temperatures which are too low the result may be that the oxidation effect of the oxygen in the glass melt is too little.

But the temperature of the glass melt during the refining process should not exceed a value of at most 1550° C., preferably at most 1500° C. and particularly preferably at most 1450° C. In the case of temperatures which are too high the decomposition of the refining agent may proceed to fast and the above described undesirable side effects may result which may compromise the quality of the glasses according to the present disclosure to a considerable extent.

It has been found that the selenium compounds used according to the present disclosure are characterized in that they can optionally be distributed in the glass melt in a particularly homogenous manner. In this way, these compounds can work as particularly effective oxidants of the Fe species in the glasses. This effect of the selenium compounds is the same as that of other refining agents which today are no longer desirable in the glass production process due to their emissions of toxic gases.

BRIEF DESCRIPTION OF THE DRAWINGS

The single FIGURE illustrates the transmittance spectra of the glasses of the comparative examples as well as the glass according to the present disclosure.

DETAILED DESCRIPTION OF THE INVENTION

Comparative Example 1

A $TiO_2$ containing borosilicate glass was prepared using a standard refining process with antimony oxide and halides. The glass obtained in this manner had the following composition, in % by weight, based on the total amount of glass: $SiO_2$ 64.0; $B_2O_3$ 8.3; $Al_2O_3$ 4.0; $Na_2O$ 6.5; $K_2O$ 7.0; ZnO 5.5; $TiO_2$ 4.0 $Sb_2O_3$ 0.6; and Cl⁻ 0.1.

The glass was colorless and without any undesirable shades of color. The glass was tested with regard to its transmission properties in the range of visible light as well as near UV and IR region. The transmittance spectrum obtained in this test is shown in the single FIGURE.

Comparative Example 2

A glass having the below mentioned composition was prepared by heating a mixture of the raw materials of the glass to about 1450° C. and subsequently keeping it at 1500° C. for about four hours. As a refining agent sulfate was used. Prior to the steps of cooling the glass melt and the subsequent shaping the glass was subjected to a homogenization step. The sand used had a proportion of 70 ppm $Fe_2O_3$ which was contained therein as an impurity. The glass obtained in this manner had with regard to its main components (undesirable impurities not considered) the following composition, in % by weight, based on the total amount of the glass: $SiO_2$ 64.1; $B_2O_3$ 8.36; $Al_2O_3$ 4.18; $Na_2O$ 6.32; $K_2O$ 6.85; ZnO 5.38; and $TiO_2$ 4.18.

The glass was tested with regard to its transmission properties in the range of visible light as well as near UV and IR region. The transmittance spectrum obtained in this test is shown in the single FIGURE.

Example 1

According to the Present Disclosure

A glass having the below mentioned composition was prepared by heating a mixture of the raw materials of the glass to about 1450° C. and subsequently keeping it at 1500° C. for about four hours. As a refining agent sodium selenite in combination with sulfate was used. Prior to steps of cooling and subsequent shaping the glass melt the glass was subjected to a homogenization step. The sand used had a proportion of 70 ppm $Fe_2O_3$ which was contained therein as an impurity. The glass obtained in this manner had with regard to its main components (undesirable impurities not considered) the following composition, in % by weight, based on the total amount of the glass: $SiO_2$ 64.1; $B_2O_3$ 8.36; $Al_2O_3$ 4.18; $Na_2O$ 6.32; $K_2O$ 6.85; ZnO 5.38; $TiO_2$ 4.18; and $SeO_2$ 0.025.

The glass was completely colorless. With the naked eye in comparison to the glass which had the composition of comparative example 1 and had been subjected to the refining process described there no differences could be determined. The glass was tested with regard to its transmission properties in the range of visible light as well as near UV and IR region. The transmittance spectrum obtained in this test is shown in the single FIGURE.

Surprisingly it was found that the transmission properties of the glass which had a composition according to the present disclosure and had been subjected to the refining process according to the present disclosure were as good as the transmission properties in the near IR of the comparison specimen.

What is claimed is:

1. An arsenic- and antimony-free colorless borosilicate glass, consisting essentially of the following oxides, in % by weight, based on the total amount of glass:

| | |
|---|---|
| $SiO_2$ | 30 to 85; |
| $B_2O_3$ | 3 to 20; |
| $Al_2O_3$ | 0 to 15; |
| $Na_2O$ | 3 to 15; |
| $K_2O$ | 3 to 15; |
| ZnO | 0 to 12; |
| $TiO_2$ | 0.5 to 10; |
| CaO | 0 to 0.1 | at least one oxygen containing selenium compound 0.001 to 0.1; and a sulfate content of at least 150 ppm (m/m), wherein the oxygen containing selenium compound is selected from the group consisting of salts of selenious acid, salts of selenic acid, selenium dioxide ($SeO_2$), selenium trioxide ($SeO_3$), and mixtures thereof.

2. The glass according to claim 1, consisting essentially of the following oxides, in % by weight, based on the total amount of glass:

| | |
|---|---|
| $SiO_2$ | 40 to 70; |
| $B_2O_3$ | 3 to 15; |
| $Al_2O_3$ | 0 to 10; |
| $Na_2O$ | 3 to 12; |
| $K_2O$ | 3 to 12; |
| ZnO | 0 to 8; |
| $TiO_2$ | 0.5 to 6; |
| CaO | 0 to 0.1; | and at least one oxygen containing selenium compound 0.001 to 0.1.

3. The glass according to claim 1, consisting essentially of the following oxides, in % by weight, based on the total amount of glass:

| | |
|---|---|
| $SiO_2$ | 30 to 85; |
| $B_2O_3$ | 3 to 20; |
| $Al_2O_3$ | 0 to 15; |
| $Na_2O$ | 3 to 15; |
| $K_2O$ | 3 to 15; |
| ZnO | 0 to 12; |
| $TiO_2$ | 0.5 to 10; |
| CaO | 0 to 0.1; | and at least one oxygen containing selenium compound 0.001 to 0.1.

4. The glass according to claim 1, wherein the glass is usable as an IR light conductor, a cover glass for a photo sensor, or a filter glass.

5. The glass according to claim 1, wherein the sulfate content is not higher than 450 ppm (m/m).

6. An arsenic- and antimony-free borosilicate glass, consisting of the following oxides, in % by weight, based on the total amount of glass:

| | |
|---|---|
| SiO$_2$ | 35 to 70; |
| B$_2$O$_3$ | 3 to 17; |
| Al$_2$O$_3$ | 0 to 12; |
| Na$_2$O | 3 to 12; |
| K$_2$O | 3 to 12; |
| ZnO | 0 to 10; |
| TiO$_2$ | 0.5 to 8; |
| CaO | 0 to 0.1; | and
at least one oxygen containing selenium compound 0.001 to 0.1,
wherein the oxygen containing selenium compound is selected from the group consisting of salts of selenious acid, salts of selenic acid, selenium dioxide (SeO$_2$), selenium trioxide (SeO$_3$), and mixtures thereof.

7. An arsenic- and antimony-free colorless borosilicate glass, comprising the following oxides, in % by weight, based on the total amount of glass:

| | |
|---|---|
| SiO$_2$ | 30 to 85; |
| B$_2$O$_3$ | 3 to 20; |
| Al$_2$O$_3$ | 0 to 15; |
| Na$_2$O | 3 to 15; |
| K$_2$O | 3 to 15; |
| ZnO | 0 to 12; |
| TiO$_2$ | 4 to 10; |
| CaO | 0 to 0.1; | at least one oxygen containing selenium compound 0.001 to 0.1; and
sulfate,
wherein the oxygen containing selenium compound is selected from the group consisting of salts of selenious acid, salts of selenic acid, selenium dioxide (SeO$_2$), selenium trioxide (SeO$_3$), and mixtures thereof.

8. The glass according to claim 7, wherein the sulfate has a content that is not higher than 450 ppm (m/m).

9. The glass according to claim 7, wherein the sulfate has a content that is not higher than 350 ppm (m/m).

10. The glass according to claim 7, wherein the sulfate has a content that is not higher than 250 ppm (m/m).

11. The glass according to claim 7, wherein the sulfate has a content that is at least 150 ppm (m/m).

12. The glass according to claim 7, wherein the sulfate is selected from the group consisting of alkali sulfates, alkaline earth sulfates, and mixtures of alkali sulfates and alkaline earth sulfates.

13. The glass according to claim 7, wherein the sulfate is selected from the group consisting of Na$_2$SO$_4$, CaSO$_4$, and mixtures of Na$_2$SO$_4$ and CaSO$_4$.

14. The glass according to claim 7, wherein the sulfate comprises SO$_3$ with a content that is at least 150 ppm (m/m) and not higher than 250 ppm (m/m).

\* \* \* \* \*